US008815363B2

(12) United States Patent
Smillie et al.

(10) Patent No.: US 8,815,363 B2
(45) Date of Patent: Aug. 26, 2014

(54) MULTILAYER PROTECTIVE LINER

(75) Inventors: Benjamin Andrew Smillie, Kingston (CA); Edward Maxwell De Brant Smith, Wilmington, DE (US); Sassan Hojabr, Kingston (CA); Scott B Marks, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 28 days.

(21) Appl. No.: 13/596,420

(22) Filed: Aug. 28, 2012

(65) Prior Publication Data

US 2013/0048131 A1 Feb. 28, 2013

Related U.S. Application Data

(60) Provisional application No. 61/528,922, filed on Aug. 30, 2011.

(51) Int. Cl.
| | | |
|---|---|---|
| *B29D 22/00* | (2006.01) | |
| *B32B 27/30* | (2006.01) | |
| *B32B 27/32* | (2006.01) | |
| *F16L 57/06* | (2006.01) | |
| *B32B 1/08* | (2006.01) | |

(52) U.S. Cl.
CPC ............... *F16L 57/06* (2013.01); *B32B 27/308* (2013.01); *B32B 27/327* (2013.01); *B32B 1/08* (2013.01)
USPC ....................................... 428/36.91; 428/36.9

(58) Field of Classification Search
CPC ...... B32B 27/308; B32B 27/327; B32B 1/08; F16L 57/06
USPC ................................. 428/36.9, 36.91; 138/97
See application file for complete search history.

(56) References Cited

U.S. PATENT DOCUMENTS

| | | | |
|---|---|---|---|
| 3,264,272 A | | 8/1966 | Rees |
| 3,404,134 A | | 10/1968 | Rees |
| 3,645,992 A | | 2/1972 | Elston |
| 4,042,559 A | | 8/1977 | Abelson et al. |
| 4,076,698 A | | 2/1978 | Anderson et al. |
| 4,254,165 A | | 3/1981 | Phelps et al. |
| 4,407,893 A | | 10/1983 | Malizio |
| 5,028,674 A | | 7/1991 | Hatch et al. |
| 5,128,410 A | * | 7/1992 | Ilendra et al. .................. 525/71 |
| 5,198,401 A | | 3/1993 | Turner et al. |
| 5,272,236 A | | 12/1993 | Lai et al. |
| 5,278,272 A | | 1/1994 | Lai et al. |
| 5,324,800 A | | 6/1994 | Welborn, Jr. et al. |
| 5,405,922 A | | 4/1995 | DeChellis et al. |
| 6,500,888 B2 | | 12/2002 | Baumgartner et al. |
| 6,518,365 B1 | | 2/2003 | Powell et al. |

(Continued)

FOREIGN PATENT DOCUMENTS

| | | |
|---|---|---|
| EP | 0181233 A2 | 5/1986 |
| JP | 2000-179752 A | 6/2000 |

OTHER PUBLICATIONS

Smillie et al, U.S. Appl. No. 13/413,186, filed Mar. 6, 2012.
Smillie et al, U.S. Appl. No. 13,413,208, filed Mar. 6, 2012.

*Primary Examiner* — N. Edwards

(57) ABSTRACT

Disclosed is a multilayer structure useful for preparing highly abrasion-resistant protective liners, including tubular articles such as multilayer tubes or pipes.

24 Claims, 3 Drawing Sheets

(56) References Cited

U.S. PATENT DOCUMENTS

| | | | |
|---|---|---|---|
| 6,562,906 B2 * | 5/2003 | Chen | 525/191 |
| 6,762,246 B2 * | 7/2004 | Chen | 525/194 |
| 7,037,967 B2 * | 5/2006 | Chen | 524/430 |
| 7,335,424 B2 * | 2/2008 | Domine et al. | 428/516 |
| 7,405,008 B2 * | 7/2008 | Domine et al. | 428/516 |
| 7,488,778 B2 * | 2/2009 | Chen | 525/191 |
| 8,410,219 B2 * | 4/2013 | Chen | 525/221 |
| 8,512,838 B2 * | 8/2013 | Zhang et al. | 428/36.7 |
| 2007/0003712 A1 * | 1/2007 | Domine | 428/31 |
| 2007/0054139 A1 * | 3/2007 | Domine | 428/474.4 |
| 2009/0107553 A1 | 4/2009 | Hayes et al. | |
| 2009/0107572 A1 * | 4/2009 | Hayes et al. | 138/141 |
| 2010/0009086 A1 | 1/2010 | Tran et al. | |
| 2010/0059132 A1 | 3/2010 | Jannson et al. | |
| 2013/0006500 A1 * | 1/2013 | Shane et al. | 701/104 |
| 2013/0048131 A1 * | 2/2013 | Smillie et al. | 138/97 |
| 2014/0053908 A1 * | 2/2014 | Smillie | 137/1 |

\* cited by examiner

MULTILAYER PROTECTIVE LINER

CROSS REFERENCE TO RELATED APPLICATION

This application claims priority to U.S. provisional application Ser. No. 61/528,922, filed Aug. 30, 2011; the entire disclosure of which is incorporated herein by reference.

FIELD OF THE INVENTION

The invention relates to a multilayer protective liner comprising a polymeric wear layer.

BACKGROUND OF THE INVENTION

Mining operations require the transport of highly abrasive particulate or slurry streams. The recovery of bitumen from oil sands is becoming increasingly important in the energy industry. Processing oil sand includes transporting and conditioning the oil sand as aqueous slurry over kilometer lengths of pipe up to one meter or more in diameter, at average slurry flow velocities from 2 to 6 m/s. Often, metal pipes such as carbon steel or cast iron pipes are used for the transport of these highly abrasive streams of oil sand slurry. They are expensive, heavy and only provide a temporary solution since they are eventually destroyed. To increase their lifetimes, the metal pipes may be rotated 90 degrees on their axes on a regular schedule to provide new transport surfaces. However, because of the pipe weight, this rotation is difficult and ultimately the entire pipe is worn out and must be replaced.

Use of plastic pipes, pipe liners and pipe coatings has been proposed to reduce these shortcomings. Many of the commonly available materials cannot stand up to such highly-abrasive mining streams and are quickly worn out. For example, high density poly(ethylene) pipes are generally used as liners for sanitary sewer and wastewater pipelines but they rapidly degrade under highly abrasive environments. U.S. Pat. No. 4,042,559 discloses abrasive granule-filled, partially-cured coatings for use in abrasion resistant coated pipes for the transport of mining slurries. U.S. Pat. No. 4,254,165 discloses processes to produce abrasion resistant pipes with 0.04-0.05-inch thick coatings of filled (such as sand) polyolefins, such as low and medium density poly(ethylene). U.S. Pat. No. 4,407,893 discloses a method for coating a metal surface with a composition comprising a polyolefin and an ionomer.

U.S. Patent Application Publications 2009/0107572 and 2009/0107553 describe abrasion resistant ionomer lined steel pipes. U.S. Patent Application Publication 2010/0108173 discloses abrasion resistant polyolefin lined steel pipes. References to other plastic pipe liners and methods for lining a pipe with a polymeric liner can be found in those publications.

U.S. Patent Application Publication 2010/0059132 describes abrasion resistant pipe liners comprising an abrasion resistant inner layer and a second structural layer comprising extrudable polymer materials. The abrasion resistant layer can be formed from a material having elastic rubber-like properties or a greater hardness than the material forming the structural layer, such as ultrahigh molecular weight polyethylene or polyamide.

In some cases, additional materials have been used to adhere polymeric pipe liners to metal pipes. Japanese Patent Application JP2000179752 discloses the use of epoxy primers to adhere ionomer tubes to water service metal pipes. The methods described therein involve either preheating the pipe prior to coating with epoxy or post-coating heating to cure the epoxy. European Patent Application EP 0181233 discloses a method for applying a protective coating to a pipe comprising applying an epoxy coating followed by applying one or more polymeric layers. Heating the pipe to cure the epoxy adds to the complexity and expense to prepare the steel pipe for bonding to the ionomer liner.

U.S. Patent Application Publication 2010/0009086 discloses a rapid-cure epoxy coating system for protecting the exterior of pipes. U.S. patent application Ser. No. 13/313,186 describes a method for bonding ionomer compositions to a metal substrate using an epoxy composition.

Because of the extreme conditions that lined pipes experience during hydroslurry operations, good adhesion of the liner to the metal pipe casing is important. It is also important that the liner have sufficient resistance to wear from the abrasive slurries to protect the pipe. Other useful properties include good chemical resistance, high temperature resistance, and low moisture transmittance. It may be difficult to attain all properties desirable for a pipe liner in a single material. Therefore, multilayer structures with layers comprising different materials may be advantageous for a pipe liner. For example, one surface layer of a multilayer structure may provide good adhesion to the metal substrate and a second surface layer may provide good abrasion resistance.

SUMMARY OF THE INVENTION

The invention provides a thick-walled, large diameter, thermoplastic multilayer tube structure comprising at least three layers, useful as an abrasion resistant liner for a metal substrate used for hydroslurry transport, wherein (a) a first surface layer acts as an abrasion resistant wear layer and comprises a soft thermoplastic composition with melting point in a range from about 70 to about 90° C. and Shore A hardness (ASTM D2240, ISO 868) from about 80 to about 90; comprising metallocene-catalyzed very low density polyethylene with a density of 0.86 to 0.91 g/cm$^3$; optionally blended with a surface modifying agent;

(b) a second surface layer acts as an adhesive layer for bonding to a metal substrate or an epoxy treated metal substrate and comprises a thermoplastic ethylene acid copolymer composition or an ionomer thereof, with melting point in a range from about 60 to about 100° C.; and (c), (d) or a combination of (c) and (d); wherein (c) is a layer of a material comprising a thermoplastic composition with melting point in a range from about 75 to about 150° C., and moisture vapor permeation value less than 2 g·mil/100 in$^2$·day; and (d) is a tie layer positioned in contact with one of the surface layers and in contact with one other layer, comprising a coextrudable tie layer composition, acting to bond the surface layer to the other layer, comprising (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids; or (2) a blend of (i) a polyolefin selected from the group consisting of polyethylene homopolymer, polyethylene copolymer, or polypropylene copolymer and (ii) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

Embodiments of the multilayer structure include those wherein (b) is a second surface layer comprising an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations; and/or (c) is (1) an ionomer of an E/W ethylene acid dipolymer wherein E represents copolymerized units of ethylene, W is present in an amount of about 2 to about 30 weight % of the E/X/Y polymer and represents copolymerized units of a $C_{3-8}$ α,β-ethylenically unsaturated carboxylic acid, wherein at least a portion of the carboxylic acid groups in the dipolymer are neutralized to salts containing alkali metal cations, alkaline earth metal cations, transition metal cations, or combinations of two or more of these metal cations; or (2) a polyethylene homopolymer, polyethylene copolymer, or polypropylene copolymer; and/or (d) is a tie layer comprising a coextrudable composition comprising (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids; or (2) a blend of (i) a polyolefin selected from the group consisting of polyethylene homopolymer, polyethylene copolymer, or polypropylene copolymer and (ii) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

A specific embodiment is a three-layer structure comprising (a) a first surface layer comprising metallocene-catalyzed very low density polyethylene with a density of 0.86 to 0.91 g/cm$^3$; optionally blended with a surface modifying agent;

(b) a second surface layer comprising an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations; and (d) a tie layer comprising a coextrudable composition comprising (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids or (2) a blend of (i) a polyolefin selected from the group consisting of polyethylene homopolymer, polyethylene copolymer, or polypropylene copolymer and (ii) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

Other embodiments include four-layer structures comprising (a) a first surface layer comprising metallocene-catalyzed very low density polyethylene with a density of 0.86 to 0.91 g/cm$^3$; optionally blended with a surface modifying agent;

(b) a second surface layer comprising an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations;

(c) an interior layer comprising (1) an ionomer of an E/W ethylene acid dipolymer wherein E represents copolymerized units of ethylene, W is present in an amount of about 2 to about 30 weight % of the E/X/Y polymer and represents copolymerized units of a $C_{3-8}$ α,β-ethylenically unsaturated carboxylic acid, wherein at least a portion of the carboxylic acid groups in the dipolymer are neutralized to salts containing alkali metal cations, alkaline earth metal cations, transition metal cations, or combinations of two or more of these metal cations; or (2) a polyethylene homopolymer, polyethylene copolymer, or polypropylene copolymer;

(d) a tie layer comprising a coextrudable composition comprising (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids or (2) a blend of (i) a polyolefin selected from the group consisting of polyethylene homopolymer, polyethylene copolymer, or polypropylene copolymer and (ii) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

A specific embodiment of a four layer structure is one in which the interior layer is (c)(1) and (d) is positioned in contact with the first surface layer and (c)(1).

Another specific embodiment of a four layer structure is one in which the interior layer is (c)(2) and (d) is positioned in contact with the second surface layer and (c)(2).

The invention also provides a method for protecting a metal pipe from abrasion during transport of a slurry comprising liquid and abrasive material through the pipe, the method comprising (a) preparing adhering a multilayer structure as described above;

(b) inserting the multilayer structure inside a pipe;

(c) adhering the multilayer structure to the inside of the pipe to prepare a lined pipe;

(d) installing the lined pipe into a pipeline for transporting a slurry comprising liquid and abrasive material; and (e) transporting the slurry through the pipeline, wherein the wear rate of the lined pipe is less than the wear rate of a non-lined pipe.

Corrosion resistance of the pipe is also improved by the use of the liners described herein.

Preferably, the inside of the metal pipe is treated with an epoxy primer to provide an epoxy-primed metal pipe prior to inserting the multilayer structure into the pipe.

DETAILED DESCRIPTION OF THE INVENTION

Figure 1A:
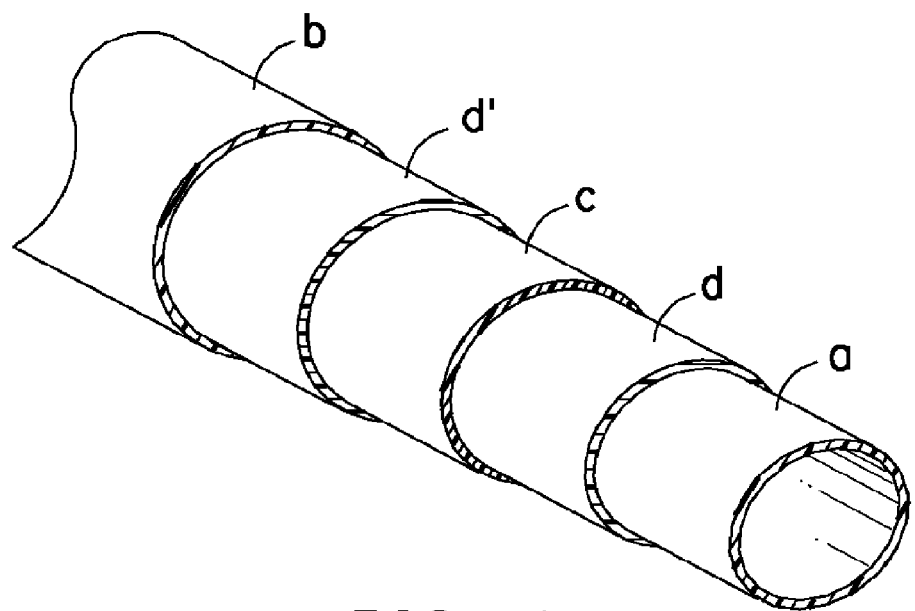
FIG. 1A shows a cutaway view of a tubular multilayer structure comprising (a) a first surface layer; (b) a second surface layer; (c) a layer of a material comprising a thermoplastic composition; (d) a tie layer positioned in contact with surface layer (a) and in contact with layer (c); and (d') a tie layer positioned in contact with surface layer (b) and in contact with layer (c).

All publications, patent applications, patents, and other references mentioned herein are incorporated by reference in their entirety.

Although methods and materials similar or equivalent to those described herein can be used in the practice or testing of the present invention, suitable methods and materials are described herein.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When the term "about" is used in describing a value or an end-point of a range, the disclosure includes the specific value or end-point referred to.

As used herein, the terms "comprises," "comprising," "includes," "including," "containing," "characterized by," "has," "having" or any other variation thereof, are intended to cover a non-exclusive inclusion. The transitional phrase "consisting of" excludes any element, step, or ingredient not specified in the claim, closing the claim to the inclusion of materials other than those recited except for impurities ordinarily associated therewith. The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format.

Where applicants have defined an invention or a portion thereof with an open-ended term such as "comprising," the description is interpreted to also describe such an invention using the terms "consisting essentially of" or "consisting of."

Use of "a" or "an" are employed to describe elements and components of the invention. This is done merely for convenience and to give a general sense of the invention. This description includes one or at least one and the singular also includes the plural unless it is obvious that it is meant otherwise.

In describing certain polymers it is to be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts is to be interpreted to mean that the polymer is made from those monomers or that amount of the monomers, and the corresponding polymers and compositions thereof.

The materials, methods, and examples herein are illustrative only and, except as specifically stated, are not intended to be limiting.

Figure 1B:
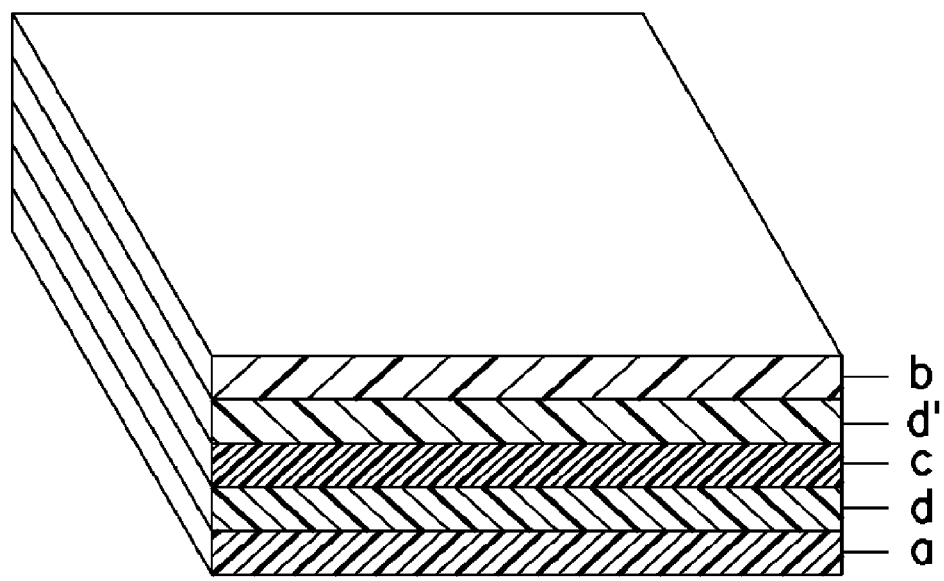
FIG. 1B shows a cross-section of a multilayer structure comprising (a) a first surface layer; (b) a second surface layer; (c) a layer of a material comprising a thermoplastic composition; (d) a tie layer positioned in contact with surface layer (a) and in contact with layer (c); and (d') a tie layer positioned in contact with surface layer (b) and in contact with layer (c).

As used herein, a "multilayer structure" comprises layers of materials wherein all layers in that structure are bonded or adhered to the layers they are in contact with. Referring to FIGS. 1-3, a multilayer ionomer structure, such as a sheet or tube, has at least one surface layer (b) that comprises an ionomer composition. As used herein, when a multilayer structure is in tubular form, the "outermost" layer is the surface layer (b) facing the outside of the tube, and the "innermost" layer is a surface layer (a) facing the inside of the tube. "Interior" layers (c), (d) and (d') are not surface layers. As used herein for multilayer structures, "adhesive" and "adhesive layer" refer to compositions and layers that are in contact with the metal substrate or to an epoxy composition used to adhere the multilayer structure to the metal. The term "wear layer" refers to the layer that is farthest from the metal substrate and functions as an abrasion resistant surface protecting the metal from abrasion. The term "tie layer" refers to a layer (d) or (d') that facilitates adherence between two other layers in a multilayer structure.

As used herein, "ambient temperature" means that no heating or cooling is applied to the coated substrate beyond what is prevailing in the environment around the coated substrate. The temperature may be from about 0° C. to about 40° C., preferably from about 20° C. to about 30° C.

For low wear protective coatings, thermoset epoxy or urethane coatings have been applied at less than 500 μm thickness. The two part epoxies can be painted onto a steel surface by spray, roll or dip coatings (Corlar® from DuPont). Two part epoxy coatings are also available as fine powders (Napgard® from DuPont) that can be applied by fusion bonding (dip coating of the hot part in a fluidized bed or electrostatic spray of the powder onto the steel). DuPont also has a line of thermoplastic polymer powder coatings under the Abcite® brand include zinc ionomers and acid copolymer resins that can be applied by fusion bonding.

Some applications need better wear and or corrosion resistance than can be provided by fused powder or paint coatings of the pipe surface. Such thin coatings do not provide sufficient abrasion resistance in applications where metal surfaces are exposed to highly abrasive materials for extended periods of time.

The compositions and multilayer structures described herein can be used to provide metal protected against abrasion by long lifetime, highly abrasion-resistant pipe liners. Applications include lined pipes for a wide variety of mining and other transportation uses over a wide range of environmental conditions. High burst strength may be another attribute of the lined pipes.

We have found that "soft" thermoplastic materials with Shore A hardness in the 80 to 90 range are preferred materials for resistance to the abrasive action of sand water slurries.

Excellent adhesion of the liner is also desirable for such pipe liners. A useful method to bond the thick-walled tubular liner to the prepared metal pipe substrate involves heating the liner to metal interface (by applying heat to the exterior of the metal pipe at a temperature less than 160° C.) while applying pressure to the inside of the liner to expand the liner so that it comes into intimate contact with the interior inside surface of the epoxy primed metal pipe and subsequently thermally activates the bond between liner and metal substrate. Bonding temperatures above 160° C. are not desirable because the thermoplastic liner tends to flow or droop under the effect of gravity at higher bonding temperatures. For high speed slurry flow, waves or a rough inside surface on the lined metal pipe can result in flow irregularities that can promote localized high wear rates. Preferred adhesives include low melting ethylene terpolymers containing acrylic acid or methacrylic acid functionality, and ionomers thereof. Low melting temperature is preferred because less heat is required to activate the bond between adhesive and metal substrate. Minimizing the heat required to activate the bond will minimize energy consumption and reduce the bonding cycle time. Minimizing the melting points of the materials comprising the thick walled multilayer structure will also reduce energy that must be added to the liner before the liner will expand under pressure to come into intimate contact with the interior surface of the pipe wall. The multilayer structure will resist abrasion, will have a smooth inside surface and remain well adhered to the metal substrate with surface and core layers having these characteristics.

For hydroslurry applications where water is the means of fluidizing the particulate, chemical resistance, measured by a test like the Standard Test Method for Environmental Stress-Cracking of Ethylene Plastics ASTM test procedure D1693, to water is of particular importance. Chemical resistance to other components, for example salt solutions (sodium chloride, potassium or calcium chloride) or hydrocarbons (gasoline) of the slurry can be determined by ASTM D1693.

An alternative method to identify chemical resistance is to immerse the selected polymer in the solvent or solution of interest and measure the weight gain. Significant weight gain after a period of exposure indicate the solution is soluble in the polymer which could lead to undesirable effects like swelling of the polymer, plasticization (softening) of the polymer and potential extraction of the low molecular portion of the polymer by the solution. ASTM procedure D570 outlines protocols that can be used to assess the water absorption of a polymer. This test can be modified to consider other solvents besides water, such as hydrocarbons including naphtha.

A good barrier to water permeation may be useful to protect the metal pipe from corrosion and prevent delamination of the liner from the pipe caused by water infiltration. Low water permeability may be most important in the first surface layer and/or interior layers. Water permeation may be assessed using ASTM F1249 Water Vapor Transmission Rate Through Plastic Film and Sheeting Using a Modulated Infrared Sensor. Normal conditions for this test are to operate at 38° C. with 100% relative humidity on one side of the test film and dry on the other side. In this test, 2 g·mil/(100 in$^2$·day) is equivalent to 31 g·25 μm/m$^2$·day.

Embodiments of the multilayer abrasion resistant structure include a first soft surface layer (the innermost layer of a tubular pipe liner, layer (a) in FIGS. 1-3) comprising a soft thermoplastic composition and a second surface layer (the outermost layer of a tubular pipe liner, layer (b) in FIGS. 1-3) comprising a low melting ionomer of an E/X/Y terpolymer described below.

The soft thermoplastic composition in the first surface layer, the abrasion resistant wear layer of the liner (innermost layer of the pipe liner, layer (a) in FIGS. 1-3) has a Shore A hardness (ASTM D2240, ISO 868) from about 80 to about 90. The soft thermoplastic composition of this layer may have a flexural modulus determined at 21° C. according to ASTM D790 of less than or equal to 120 MPa, preferably from 25 to 120 MPa.

The material for the first layer comprises or consists essentially of metallocene-catalyzed very low density polyethylene (m-VLDPE) with a density of about 0.86 to about 0.91 g/cm$^3$, preferably about 0.88 to about 0.90 or about 0.91 g/cm$^3$. Notable m-VLDPE compositions include ethylene-octene copolymers. They are made using conditions well known in the art for continuous polymerization. Typically polymerization temperatures of 0 to 250° C. and pressures from atmospheric to 1000 atmospheres (110 MPa) are used. Suspension, solution, slurry, gas phase or other polymerization methods can be used. A support for the catalyst can be used but preferably the catalysts are used in a homogeneous (soluble) manner. Suitable process conditions and catalysts that can be used to form the metallocene catalyzed polyethylenes are disclosed in Welborn, et. al. U.S. Pat. No. 5,324,800, Lai, et. al., U.S. Pat. No. 5,278,272, Lia, et al., U.S. Pat. No. 5,272,236, DeChellis, et al., U.S. Pat. No. 5,405,922 and Turner, et al., U.S. Pat. No. 5,198,401, which patents are hereby incorporated by reference.

A preferred ethylene-octene copolymer has a density of about 0.88 to about 0.91 g/cm$^3$, a melting point from about 70 to about 95° C., an ultimate tensile strength of about 15 to about 26 MPa and a Shore A hardness of 80 to 90. A particular preferred m-VLDPE is an ethylene-octene copolymer having a density of 0.88 to 0.90 g/cm$^3$, an MI of 0.1 to 4.0 g/10 min. measured in accordance with ASTM D1238 and a melting point greater than 75° C. as measured by ASTM D3418.

The first layer material may also be blended with surface modifying agents such as ultrahigh molecular weight siloxane polymers.

The very low density polyethylene composition used in the first surface layer (a) may have moisture vapor permeation value less than 2 g·mil/100 in$^2$·day, making it suitable to function as a moisture resistant layer in addition to its function as the wear layer.

Ionomers are useful in the second surface layer, layer (b) in FIGS. 1-3 and interior layers (layer (c) in FIGS. 1-3). The terms "thermoplastic ionomer polymer" and "ionomer", and similar terms used herein, refer to a thermoplastic ionomer made from a parent acid copolymer comprising, consisting essentially of, or prepared from copolymerized units of an α-olefin, preferably ethylene, copolymerized units of an α,β-ethylenically unsaturated carboxylic acid, and optionally copolymerized units of a softening comonomer. "Softening" means that the polymer is made less crystalline. Ionomers comprise such acid copolymers wherein at least a portion of the carboxylic acids are neutralized to provide carboxylate salts with a metal ion.

The acid copolymers used to make the ionomer compositions described herein are preferably random acid copolymers. In random copolymers, at least some of the atoms comprising the original monomers are copolymerized as part of the polymer backbone or chain.

Acid copolymers may be described as E/X/Y copolymers where E represents copolymerized units of ethylene, X represents copolymerized units of a $C_{3-8}$ α,β-ethylenically unsaturated carboxylic acid, preferably acrylic acid or methacrylic acid, and Y represents copolymerized units of a softening comonomer selected from alkyl acrylate or alkyl methacrylate, wherein the alkyl groups have from 1 to 8 carbon atoms, or vinyl acetate. X is present in an amount of about 2 to about 30 (or about 2 to 25, or about 2 to 20, or about 5 to 25) weight % of the E/X/Y polymer, and Y is present in from 0 to 45 weight % of the E/X/Y copolymer.

E/X/Y terpolymers may be useful in the adhesive layer (the second surface layer or the outermost layer in a tubular pipe liner, layer (b) in FIGS. 1-3) in either nonionized form or as the base resin of an ionomer. Preferably such terpolymers are used as the precursor polymers for ionomers used in the adhesive layer of the multilayer structure. Included are E/X/Y terpolymers in which X represents copolymerized units of methacrylic acid in an amount of about 2 to about 30 (or about 2 to 25, or about 2 to 20, or about 5 to 25) weight % of the E/X/Y terpolymer and Y represents copolymerized units of an alkyl methacrylate or preferably an alkyl acrylate in an amount from 3 to 45 weight % of the E/X/Y terpolymer (such as from a lower limit of 3 or 5 or preferably 10, to an upper limit of 25, 30 or 45). These terpolymers include without limitation ethylene/methacrylic acid/methyl acrylate, ethylene/methacrylic acid/ethyl acrylate, and ethylene/methacrylic acid/iso-butyl acrylate terpolymers, and preferably ethylene/methacrylic acid/n-butyl acrylate terpolymers. A preferred E/X/Y terpolymer is one wherein X is methacrylic acid, present in an amount from 5 to 20 weight % of the E/X/Y terpolymer and Y is butyl acrylate, present in an amount from 10 to 30 weight % of the E/X/Y terpolymer.

Similarly, terpolymers may include copolymerized units of acrylic acid in about 2 to about 30 (or about 2 to 25 or about 2 to 20, or about 5 to 25) weight % of the E/X/Y polymer, and copolymerized units of alkyl methacrylate or alkyl acrylate in an amount from 3 to 45 (such as from a lower limit of 3 or 5 or preferably 10, to an upper limit of 25, 30 or 45) weight % of the E/X/Y terpolymer.

Of note are E/X/Y terpolymers, wherein X (e.g. acrylic acid or preferably methacrylic acid) is present in an amount from 5 to 20 weight % of the copolymer and Y (e.g. alkyl acrylate such as butyl acrylate) is present in an amount from 10 to 30 weight % of the copolymer.

A specific example is an E/X/Y terpolymer comprising 10 weight % methacrylic acid and 10 weight % n-butyl acrylate based on the total weight of the parent acid terpolymer, the remainder ethylene, with MI of about 10 g/10 min. This terpolymer may be useful in the adhesive layer in nonionized form.

Another specific example is an E/X/Y terpolymer comprising containing 9 weight % methacrylic acid and 23.5 weight % n-butyl acrylate based on the total weight of the parent acid terpolymer, the remainder ethylene. An ionomer prepared from this terpolymer may be useful in the adhesive layer.

Also of note are dipolymers, copolymers consisting essentially of copolymerized units of ethylene and copolymerized units of $C_{3-8}$ α,β-ethylenically unsaturated carboxylic acid, preferably acrylic acid or methacrylic acid, and 0% of additional softening comonomer. Such E/W dipolymers include those wherein W is present in an amount of 5 or 10 to 25 weight % of the dipolymer, including without limitation ethylene/acrylic acid dipolymers or ethylene/methacrylic acid dipolymers, and are preferably used for ionomers in an interior core layer of the multilayer structure (layer (c) in FIGS. 1-3).

The parent acid copolymers may be polymerized as disclosed in U.S. Pat. Nos. 3,404,134; 5,028,674; 6,500,888; and 6,518,365. They may be neutralized as disclosed in U.S. Pat. Nos. 3,264,272 and 3,404,134 to salts comprising metal ions. The ionomers may be neutralized to any level that does not result in an intractable (not melt processable) polymer without useful physical properties. The ionomers are neutralized so that from about 5 to about 90%, or preferably from about 15 to about 90%, more preferably about 40 to about 75% of the acid moieties of the acid copolymer are neutralized to form carboxylate groups, based on the total carboxylic acid content of the parent acid copolymers as calculated for the non-neutralized parent acid copolymers.

Preferred counterions for the carboxylate groups include alkali metal cations, alkaline earth metal cations, transition metal cations, and combinations of two or more of these metal cations. The metal ions may be monovalent, divalent, trivalent, multivalent, or mixtures thereof. When the metallic ion is multivalent, complexing agents such as stearate, oleate, salicylate, and phenolate radicals may be included, as disclosed in U.S. Pat. No. 3,404,134. The metallic ions are preferably monovalent or divalent metallic ions.

Preferably, cations useful in the ionomers include lithium, sodium, potassium, magnesium, calcium, or zinc, or combinations of two or more of these cations. More preferably, the metallic ions are selected from the group consisting of sodium, lithium, magnesium, zinc and mixtures thereof, yet more preferably, sodium, zinc and mixtures thereof. Most preferably, the metallic ions are zinc.

An ionomer composition used as the adhesive layer in the multilayer liner structure (layer (b) has a melting point of about 60 to about 220° C., preferably about 60 to about 80° C., preferably from about 65 to about 75° C. Preferably, it also has flexural modulus determined at 21° C. according to ASTM D790 of less than or equal to 90 MPa and Shore D hardness (ASTM D2240, ISO 868) from about 30 to about 50.

The multilayer structure may also comprise at least one tie layer (layers (d) or (d') in FIGS. 1-3) comprising a coextrudable tie layer composition comprising a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids.

Such tie layers are useful to adhere a layer comprising the thermoplastic urethane to a layer comprising a polyolefin (such as polyethylene homopolymer or copolymer or polypropylene copolymers) or to a layer comprising an ethylene acid terpolymer or ionomer thereof.

Graft copolymers are synthesized by appending or "grafting" a moiety as a pendant group on an already-formed polymer chain. The grafted comonomer is attached to non-terminal repeat units of an existing polymer chain in a step subsequent to formation of the polymer chain, often by a free radical reaction. In a graft copolymer, none of the atoms of the grafted group are incorporated into the backbone of the polymer chain. The term "trunk polymer" as employed herein includes polyolefins such as polyethylene, ethylene propylene copolymers, and polypropylene or the polymerization product of ethylene and at least one additional polymerizable monomer such as vinyl acetate, alkyl acrylate, alkyl methacrylate, etc. that are polymerized or copolymerized and subsequently grafted with an additional comonomer to provide a graft copolymer.

A preferred anhydride is maleic anhydride. These maleic anhydride-grafted polymers (maleated polymers) are polymeric materials in which maleic anhydride is reacted with an existing polymer, often under free-radical conditions, to form anhydride groups appended to the polymer chain. They include maleated polyethylene, maleated polypropylene, maleated ethylene vinyl acetate copolymers, maleated ethylene methyl acrylate copolymers, maleated metallocene polyethylene, maleated ethylene propylene copolymers, maleated styrene-ethylene-butene-styrene triblock copolymer, and maleated polybutadiene and maleated ethylene propylene diene copolymers.

The trunk polymers may be synthesized and subsequently grafted with maleic anhydride according to well-known procedures. Such graft copolymers are also commercially available from DuPont under the tradename Fusabond®.

A notable maleated copolymer useful as tie layer in the multilayer structure is a maleic anhydride modified ethylene-alkyl acrylate graft copolymer.

The multilayer structure may have an interior layer (layer (c) in FIGS. 1-3) in addition to the surface layers. The interior layer (c) provides the high thermal resistance to the pipe required by many demanding uses. Polymers useful in the interior layer have melting points in a range from about 75 to about 150° C., preferably about 80° C. to 120° C. or higher, most preferably about 85° C. or higher. The interior layer may also serve as a moisture barrier, and the interior layer composition has a moisture vapor permeation value less than 2 g·mil/100 in²·day, preferably below 1.5 g·mil/100 in²·day, or lower.

For an E/W ionomer used in an interior layer of the multilayer liner structure (layer (c) in FIGS. 1-3), the composition has a flexural modulus determined at 21° C. according to ASTM D790 of greater than 80 MPa, preferably greater than 200 MPA. Preferably the ionomer has a melting point in a range from about 75 to about 150° C., preferably about 80° C. to 120° C. or higher, most preferably about 85° C. or higher. The ionomer layer provides the high thermal resistance to the pipe required by many demanding uses. To serve as a moisture barrier, the composition has a moisture vapor permeation value less than 2 g-mil/100 in²-day, preferably below 1.5 g-mil/100 in²-day, or lower.

A notable ionomer used in an interior layer consists essentially of an E/W dipolymer containing 15 weight % methacrylic acid based on the total weight of the parent acid dipolymer, the remainder ethylene, wherein at least a portion of the carboxylic acid groups are neutralized to salts of zinc ions.

Suitable ionomers for the adhesive or interior layers are available commercially from E. I. du Pont de Nemours and Company, Wilmington, Del. (DuPont) under the Surlyn® tradename.

The interior layer (c) of the multilayer structure may alternatively comprise polyethylene homopolymers, polyethylene copolymers, or polypropylene copolymers. These polymers also have melting points in a range from about 75 to about 150° C., preferably about 80° C. to 120° C. or higher, most preferably about 85° C. or higher moisture vapor permeation values of less than 2 g·mil/100 in²·day, preferably below 1.5 g·mil/100 in²·day, or lower.

Polyethylene homopolymers or polyethylene copolymers comprise units derived from ethylene as the major portion or percentage by weight of the copolymer. By major portion or percentage is meant greater than about 70 weight %, or greater than about 80 weight % or more of the copolymer. Examples of polyethylene copolymers are copolymers of ethylene and alpha-olefins, including copolymers with propylene and other alpha-olefins, wherein copolymerized units of ethylene comprise the major portion of the copolymer.

Suitable polyethylene homopolymers and polyethylene copolymers include linear polyethylenes such as high density polyethylene (HDPE), linear low density polyethylene (LLDPE), very low or ultralow density polyethylenes (VLDPE or ULDPE), branched polyethylenes such as low density polyethylene (LDPE), and copolymers of ethylene and alpha-olefin monomers prepared in the presence of metallocene catalysts, single site catalysts or constrained geometry catalysts (herein referred to as metallocene polyethylenes, or MPE). The densities of PE suitable for use in the composition range from about 0.865 g/cc to about 0.970 g/cc.

Polyethylene copolymers may be prepared by a variety of methods. Examples of such processes include, but are not limited to, the well-known Ziegler-Natta catalyst polymerization process (see for example U.S. Pat. Nos. 4,076,698 and 3,645,992), metallocene catalyzed polymerization, VERSIPOL® single-site catalyst polymerization and free radical polymerization. The term metallocene catalyzed polymerization includes polymerization processes that involve the use of metallocene catalysts as well as those processes that involve use of constrained geometry and single-site catalysts. Polymerization may be conducted as a solution-phase process, a gas phase-process and the like. Polyethylenes used in the compositions described herein may be obtained from recycled material.

Examples of linear polyethylenes include ethylene copolymers having copolymerized units of alpha-olefin comonomers such as butene, hexene or octene. Suitable alpha-olefins may be selected from the group consisting of alpha-olefins having at least three carbon atoms, preferably from 3 to 20 carbon atoms. These comonomers may be present as copolymerized units in an amount up to about 20 weight % or 30 weight % of the copolymer. Preferred alpha-olefins include propylene, 1-butene, 1-hexene, 4-methyl-1-pentene, 1-octene, 1-decene, 1-tetradecene and 1-octadecene. Copolymers may be obtained by polymerization of ethylene with two or more alpha-olefins, preferably including propylene, 1-butene, 1-octene and 4-methyl-1-pentene.

Also contemplated for use as the polyethylene component are blends of two or more of these ethylene alpha-olefin copolymers as well as mixtures of an ethylene homopolymer and one of the suitable ethylene alpha-olefin copolymers.

Polypropylene copolymers suitable for use as the polyolefin component of the multilayer structure include random copolymers, block copolymers and higher order copolymers, such as terpolymers of propylene. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene. Copolymers of propylene include copolymers of propylene with other olefins such as 1-butene, 2-butene and the various pentene isomers, etc. and preferably copolymers of propylene with ethylene, wherein units derived from propylene comprise the major portion or percentage by weight of the copolymer.

Polypropylene random copolymers can be manufactured by any known process. For example, polypropylene polymers can be prepared in the presence of Ziegler-Natta catalyst systems, based on organometallic compounds and on solids containing titanium trichloride.

Block copolymers can be manufactured similarly, except that propylene is generally initially polymerized by itself in a first stage and propylene and additional comonomers such as ethylene are then polymerized, in a second stage, in the presence of the polymer obtained during the first stage. Each of these stages can be carried out, for example, in suspension in a hydrocarbon diluent, in suspension in liquid propylene, or in gaseous phase, continuously or discontinuously, in the same reactor or in separate reactors.

When used herein, "polypropylene" refers to any of the polypropylene copolymers described above.

Figure 3A:
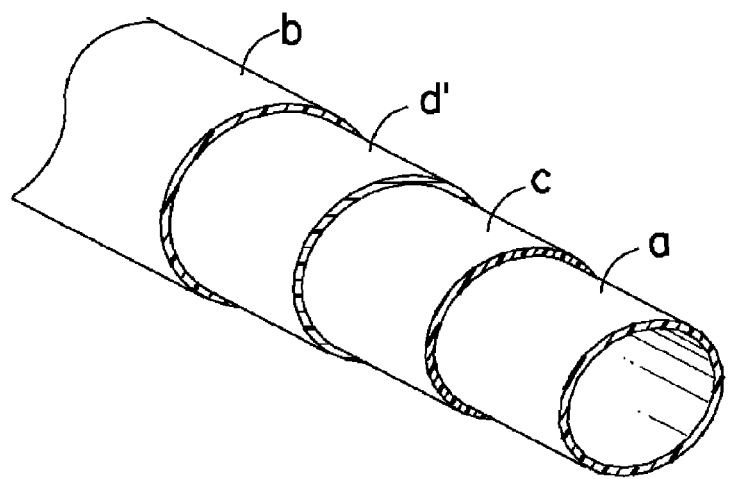
FIG. 3A shows a cutaway view of a tubular multilayer structure comprising (a) a first surface layer; (b) a second surface layer; (c) a layer of a material comprising a thermoplastic composition; and (d') a tie layer positioned in contact with surface layer (b) and in contact with layer (c).
Figure 3B:
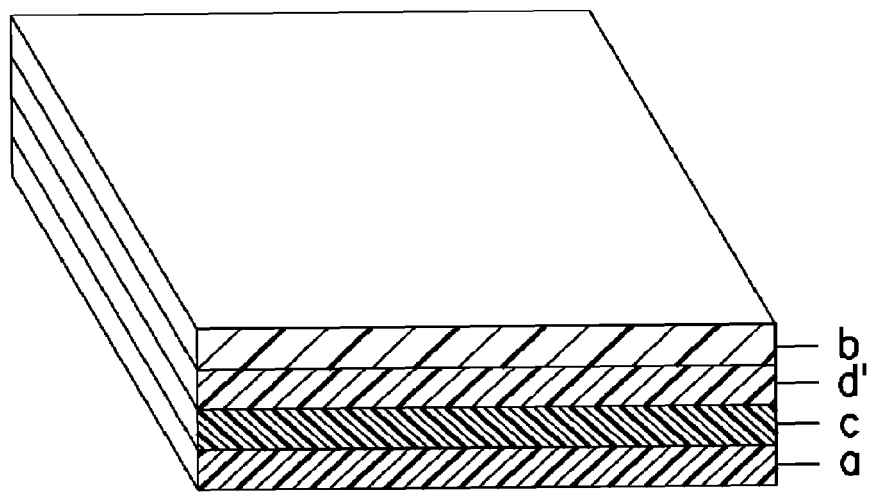
FIG. 3B shows a cross-section of a multilayer structure comprising (a) a first surface layer; (b) a second surface layer; (c) a layer of a material comprising a thermoplastic composition; and (d') a tie layer positioned in contact with surface layer (b) and in contact with layer (c).

Referring to FIGS. 3A and 3B, an example multilayer structure comprises, in order, the first surface layer (a), an interior layer (c) comprising high density polyethylene or polypropylene copolymer, a tie layer (d') and the second surface layer (b) comprising an ethylene acid terpolymer comprising an E/X/Y terpolymer wherein E represents copolymerized units of ethylene, X is present in an amount of about 2 to about 30 weight % of the E/X/Y polymer and represents copolymerized units of a $C_{3-8}$ $\alpha,\beta$-ethylenically unsaturated carboxylic acid, and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

Figure 2A:
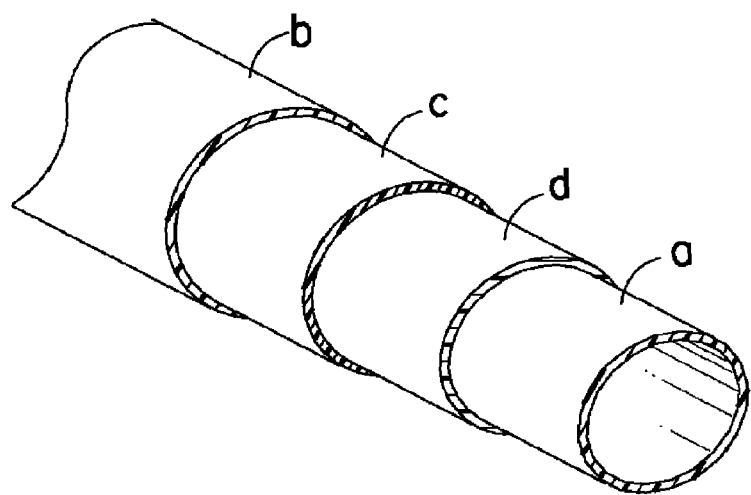
FIG. 2A shows a cutaway view of a tubular multilayer structure comprising (a) a first surface layer; (b) a second surface layer; (c) a layer of a material comprising a thermoplastic composition; and (d) a tie layer positioned in contact with surface layer (a) and in contact with layer (c).
Figure 2B:
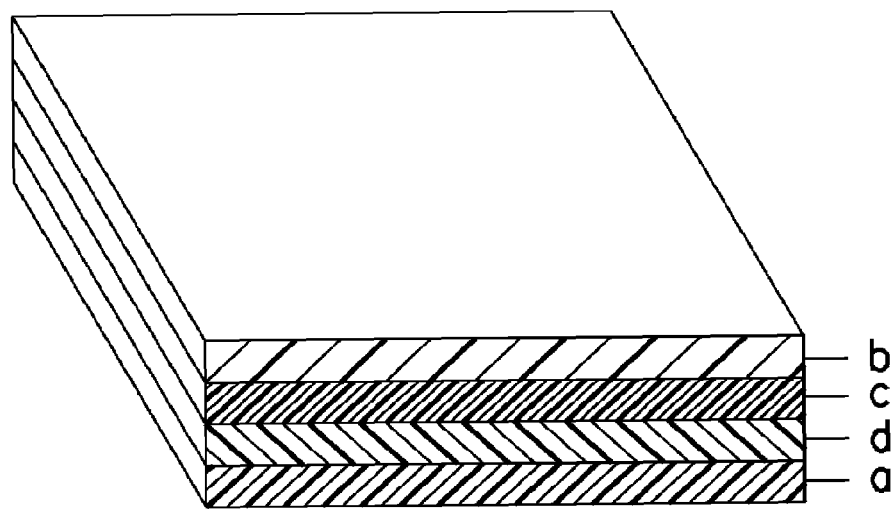
FIG. 2B shows a cross-section of a multilayer structure comprising (a) a first surface layer; (b) a second surface layer; (c) a layer of a material comprising a thermoplastic composition; (d) a tie layer positioned in contact with surface layer (a) and in contact with layer (c).

Referring to FIGS. 2A and 2B, another example multilayer structure comprises, in order, the first surface layer (a), a tie layer (d), an interior layer (c) comprising an ionomer of an E/W dipolymer, and the second surface layer (b) comprising an ethylene acid terpolymer comprising an E/X/Y terpolymer wherein E represents copolymerized units of ethylene, X is present in an amount of about 2 to about 30 weight % of the E/X/Y polymer and represents copolymerized units of a $C_{3-8}$ $\alpha,\beta$-ethylenically unsaturated carboxylic acid, and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

The compositions of any of the layers may include additives known in the art. The additives include plasticizers, processing aids, flow enhancing additives, flow reducing additives, lubricants, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and the like. One of ordinary skill in the art will recognize that additives may be added to the compositions using techniques known in the art or variants thereof, and will know the proper amounts for addition based upon typical usage. The total amount of additives used in the composition may be up to about 5, 10 or 15 weight % based upon the weight of the composition.

The compositions described above can be formed or incorporated into generally planar multilayer sheets, or multilayer tubular pipes by methods known in the art. In general, sheets and pipes are thicker and stiffer than films and tubular films, respectively. The multilayer structures can be used as abrasion resistant liners or protective coverings.

Example multilayer structures may have three or more layers, in which the first surface layer (a) comprises the soft thermoplastic composition, the second surface layer (b) comprises a low melting soft ionomer, and at least one interior layer (c) which may or may not comprise an ionomer. Additionally, the surface layers may have different thicknesses, depending on their function. For example, the first surface layer (a) may be thicker and serves as an abrasion-resistant layer and the second surface layer (b) may be thinner and serves as an adhesion layer to bond with the epoxy-coated substrate.

A multilayer liner of note comprises a first soft surface layer (a) of the soft thermoplastic composition that is an abrasion resistant layer, a second surface layer (b) of a low melting ionomer adhesive composition that may be adhered to metal or epoxy-primed metal, and at least one interior layer (c) of a thermoplastic resin (including an additional ionomer layer different from the adhesive layer). The interior layer may provide bulk to the structure and/or may modify the properties of the structure, such as providing enhanced moisture barrier.

A notable multilayer structure comprises a first surface layer (a) comprising the soft thermoplastic composition, an interior layer (c) comprising an ionomer of an ethylene acid dipolymer, and a second surface layer (b) comprising an ionomer of an ethylene acid terpolymer. A multilayer structure with ionomers in two adjacent categorical layers (such as adhesive and interior) generally does not require additional tie layers between the interior and adhesive layer, because the different ionomers adhere well to each other. For the same reason, a multilayer structure based on a low melting ethylene acid copolymer or terpolymer adhesive layer and an ionomer interior layer will not require tie layers.

The liner may be a complex multilayer structure of, in order, a first surface layer (a) comprising the soft thermoplastic composition wear layer, a first tie layer (d), an interior layer (c) of high density polyethylene (HDPE) or polypropylene copolymer (cPP), a second tie layer (d') and a second surface layer (b) of terpolymer ionomer capable of bonding to the epoxy-primed steel. The tie layers (d) and (d') bond the high density polyethylene (HDPE) or polypropylene copolymer (cPP) to the ionomer layer (c). By adding a layer of HDPE or cPP to the structure water permeation can be reduced in a much thinner liner structure. Materials suitable for optional tie layers (d) and (d') include maleated graft copolymers and ethylene dicarboxylate random copolymers as described above.

A multilayer sheet may be produced by any method known in the art. Preferably the sheet is produced through melt processes, such as extrusion or coextrusion blown film processes, extrusion or coextrusion film or sheet melt casting processes, sheet profile extrusion or coextrusion processes, lamination processes, extrusion coating processes, calendar processes and the like. The films and sheets may undergo secondary formation processes, such as the plying together of preformed films or sheets to produce thicker sheets through thermal lamination.

Tubular films may be prepared by blown film extrusion or coextrusion. Alternatively, planar films and sheets may be formed into tubular articles by rolling widthwise to bring opposed ends of the sheet into contact, and bonding the edges together by processes including extrusion welding. The ends can be joined using either overlapping joints or butt joints.

Cast or blown films are typically up to 500 μm thick. Thicker structures may be described as sheets or tubes. Some protective applications may require protective layers 2000 to 3000 μm thick. If the wear layer is less than 0.04 inches thick (1 mm) the hardness of the supporting steel backing reduces the ability of the wear layer to behave elastically to the abrasive slurry and consequently the wear resistance of the liner deteriorates. Sheets may be from 3 to 60 mm thick. Thicker sheets provide more material for wear and reduce the permeation rate of water and chemicals through the liner so that interference with the bond between liner and prepared steel is minimized. In some cases, thick sheets or tubes may be built up by overlaying and adhering two or more thinner films.

As used herein, "overlaying" comprises placing layers of materials so that at least one layer is in contact with at least one other layer but is not bonded or adhesively attached to that other layer. Additional layers may be bonded or adhesively attached to the layers that are in contact but not bonded or adhesively attached.

A multilayer liner in the form of a tube comprises an innermost layer (a) having a thickness of about 6.3 to about 51 mm (about 0.25 to about 2 inches) comprising a soft thermoplastic composition described above. The tube may have a hollow circular profile and the wall thickness may be uniform around the circumference of the tube, or the tube may have any profile and the wall thickness may vary around the circumference of the tube as desired, provided it is at least about 6.3 mm. The soft thermoplastic composition is positioned as the innermost layer (a) to provide desirably superior abrasion resistance. The tube thickness provides not only a long lifetime under extreme abrasive use conditions, but also provides chemical resistance to protect the steel pipe from both abrasion and corrosion.

For hydroslurry transport of oil sands the liner is desirably from 0.7 to 1.5 inches thick (18 to 40 mm). The adhesive layer (b) may be at least 0.05 inch (1.25 mm) thick or more. To provide adequate structure to the multilayer liner, the interior layer (c) is desirably 30 to 50% of the overall thickness of the liner and the wear layer would be the balance, about 0.3 inches to about 1 inches (7.8 mm to 26.8 mm).

For transport of hydroslurries other than oil sands, where some wear resistance is required, the minimum liner thickness may be about 0.01 inch (2.5 mm). The liner may comprise about 1.25 mm of adhesive layer (b) with the balance divided between interior layer (c) and wear layer (a).

The multilayer tube may have any dimensions (including outside diameter, inside diameter and length) required to meet the end use needs. For example but not limitation the tube preferably has an outer diameter (OD) of about 2.54 to about 254 cm (about 1 to about 100 inches), more preferably about 25.4 to about 152 cm (about 10 to about 60 inches) and most preferably about 51 to about 102 cm (about 20 to about 40 inches). For example but not limitation the tube may have a length of about 1.5 to about 12.2 m (about 5 to about 40 feet), or about 3.1 to about 9.1 m (about 10 to about 30 feet) or about 10 to about 30 m (about 30 to 100 feet) to provide convenient lengths for storage, transport, handling and installation. Longer lined sections are preferred to minimize the number of joints that need to be made in the field.

The tubular liner may be produced by any suitable process. For example, the tube may be formed by melt coextrusion of a thick sheet that is subsequently rolled and seamed into a tube or of a thick tube. In either the sheet or the tube cases layers of sheet or layers of tube may be plied together and then during the bonding of the plies into the epoxy primed pipe fuse together to develop strong thermal bonds to the epoxy primed steel as well as strong thermal bonds between adjacent plies. More detailed descriptions of such processes can be found in U.S. Patent Application Publication 2009/0107572.

The liner may be in the form of a multilayer tube comprising an outermost layer (b) comprising an ionomer composition, an innermost layer (a) comprising the soft thermoplastic composition, and an interior layer (c) that comprises a thermoplastic material, including an ionomer with different composition than the outermost ionomer composition, or a polyolefin, with optional tie layers (d) and/or (d'), adhered to the inside of a metal pipe.

Copending application U.S. Ser. No. 13/413,186 describes in greater detail metal substrates that can be lined with the abrasion resistant liner.

Also as described in greater detail in copending application U.S. Ser. No. 13/413,186, it is desirable to use an epoxy coating on the surface of the metal to be protected by the abrasion resistant liner. To minimize the cost of epoxy coating the steel pipe it is desirable to use an epoxy that can be applied to the prepared steel pipe (sandblasted to white metal) at ambient temperature and that requires no preheating or post heating of the steel to achieve a hard durable surface finish. Since the ionomer liner is to be applied to the inside of steel pipes, it is important to develop a strong bond at the lowest possible interface temperature between epoxy and ionomer to prevent drooping or flow of the liner due to the pull of gravity. The epoxy primer desirably provides a strong thermally activated bond to the ionomer liner at an interface temperature between epoxy and ionomer that is higher than the melting point of the ionomer liner composition (about 90° C.), but less than a temperature at which the melt viscosity of the liner compositions are so low that they would start to flow.

A notable epoxy composition is SP-2888RG, an epoxy/urethane two part epoxy primer sold by Specialty Polymer Coatings, #101 20529 62nd Avenue, Langley BC V3A 8R4.

A notable base resin is EPON 828, an undiluted clear difunctional bisphenol A/epichlorohydrin derived liquid epoxy resin, sold by Hexion Specialty Chemicals, Inc. 180 East Broad Street, Columbus, Ohio 43215 (Hexion). This resin can be mixed with various chemical activators to provide various cure rates.

Methods for bonding the multilayer liner to metal substrates, including epoxy-coated substrates, are described in greater detail in copending application U.S. Ser. No. 13/413,186.

The liners described herein provide lined pipes with high abrasion-resistance and corrosion resistance for the conveyance of solids and slurries such as found in the agriculture, food and mining industries. The ionomer layer in the pipes provides very long lifetime, especially desirable for those industries that require long service lifetime due to the great maintenance and replacement complexity and cost. For example, oil slurry mining operations require kilometers of slurry pipelines in extreme environments, such as northern Alberta, Canada, so extended pipe lifetime is very desirable. Other mining operations that include the transport of highly abrasive particulate or slurry streams from the mine to processing refinery include, for example, iron ore, coal and coal dust, and the like, and in further non-mining transport processes, such as grain, sugar and the like.

EXAMPLES

The following Examples are intended to be illustrative of the invention, and are not intended in any way to limit its scope.

Melt Index (MI) or Melt Flow Rate (MFR) was measured by ASTM D1238 at 190° C. using a 2.16 kg mass, unless indicated otherwise. A similar ISO test is ISO 1133. Shore D hardness was measured according to ASTM D2240 or ISO 868.

Materials Used

ION-1: a poly(ethylene-co-n-butyl acrylate-co-methacrylic acid) containing 9 weight % methacrylic acid and 23.5 weight % n-butyl acrylate based on the total weight of the parent acid terpolymer, the carboxylic acid groups neutralized to about 51 mole % to salts of zinc ions, with an MI of about 0.6 to 0.8 g/10 min and a Shore D hardness of 40 and a Shore A of 84.

ION-2: a poly(ethylene-co-methacrylic acid) with 15 weight % methacrylic acid, the carboxylic acid groups neutralized to about 58 mole % to salts of zinc ions with MI of about 0.7 g/10 min and Shore D hardness of 64 and a shore A of 90.

Sample soft thermoplastic compositions for testing include the following.

| code | grade | Density (g/cm³) | MP (° C.) | Shore D | Shore A | Ultimate Tensile Strength (MPa) |
|---|---|---|---|---|---|---|
| m-LLDPE ethylene octene copolymers available from Dow Chemical Company | | | | | | |
| EO1 | 38677 | 0.870 | | | | |
| EO2 | 8130 | 0.864 | 56 | 13 | 63 | 2.4 |
| EO4 | 8677 | 0.863 | | | | |
| EO5 | 8180 | 0.863 | 47 | 16 | 63 | 6.3 |
| EO6 | 8100 | 0.87 | 60 | 22 | 73 | 9.76 |
| EO7 | 8003 | 0.885 | 77 | 31 | 84 | 18.2 |
| EO8 | PL 1880 | 0.902 | 99 | 42 | 89 | 24.8 |
| m-LLDPE ethylene butene copolymers available from Dow Chemical Company | | | | | | |
| EB1 | ENR-7380 | 0.87 | 50 | 22 | 66 | 9.1 |
| EB2 | ENR-7270 | 0.88 | 64 | 29 | 84 | 13.0 |

| Code | Co-monomer | Density (g/cm³) | MP (° C.) | Shore A | Flexural Modulus (MPa) | Ultimate Tensile Strength (MPa) |
|---|---|---|---|---|---|---|
| Other Ethylene Copolymers available from DuPont | | | | | | |
| EMA | 35 weight % Methyl acrylate | | 77 | 77 | 4.3 | 4.7 |
| EVA1 | 40 weight % Vinyl acetate | 0.967 | 58 | 52 | | 10.2 |
| EVA2 | 40 weight % Vinyl acetate | 0.965 | 47 | 40 | | |

-continued

| High Density Polyethylene available from Chevron Phillips | | | |
|---|---|---|---|
| Code | Grade | Density (g/cm³) | Ultimate Tensile Strength (MPa) |
| HDPE | Marflex 9659 | 0.962 | 42 |

CLU: a crosslinked cast urethane (2 part urethane) shore A 75 available from Auto Add On, Kingston, ON
Mild Steel (used as a control on many of the wear measures) refers to ASTM 1018 cold rolled steel.

The following additives commercially available from Dow Corning are blended with some of the materials listed above to prepare compositions for testing.

| Additives | |
|---|---|
| Code | Description |
| MB25 | 25 weight % ultra high molecular weight siloxane dispersed in ION-2 |
| MB 50-002 | 50 weight % ultra high molecular weight siloxane dispersed in LDPE |
| MB50-010 | 50 weight % ultra high molecular weight siloxane dispersed in polyester elastomer |

Thickness and diameter in the following tables, unless specifically indicated, are in inches (1 inch=2.54 cm). "NM" stands for "not measured."

In some cases test results on mixtures of wear polymers and additives are shown. These mixtures were prepared by drying the polymers and then using a 25 mm 38/1 L/D ZSK-25 World Lab twin-screw extruder manufactured by Krupp Werner & Pfleiderer (W&P) melt blends were prepared, quenched and pelletized.

The dried thermoplastic or melt blends of thermoplastic polymers were then converted to test specimens by injection molding into 3.1 by 100 by 110 mm plaques using a Nissei 180-ton injection molding machine.

The crosslinked urethane (CLU) samples were prepared by casting the two part mixture into 3 mm thick and 6 mm thick, 150 mm by 150 mm molds. The urethane was allowed to cure and cool at ambient conditions.

Test Methods and Results

Shore D and/or Shore A Hardness

These were either provided by the commercial supplier or determined according to ASTM D2240 "Standard Test Method for Rubber Property—Durometer Hardness" using at PTC Instruments model 307L. Measured values for Shore A are reported in Table 1.

Abrasion Resistance Testing

Samples of various materials were tested for abrasion resistance according to the following Slurry Jet Erosion (SJE) test procedure.

The SJE test is generally used to evaluate the abrasion resistance performance of a material working in a slurry environment. The wear from a slurry jet is affected by many factors such as jet speed, distance, impingement angle, sand concentration and nature of the sand in the slurry. Since the size, form and hardness of the slurry particles may vary among applications, this test is often used for comparison and reference.

The test apparatus used consisted of a test chamber, connection pipes, a pump, a heater, a flow meter and a temperature controller. Abrasion resistance was assessed according to the following procedure. Wear test coupons were cut from injection molded plaques of the materials.

Before and after the SJE test, the samples (2.5 by 2.5 by 0.31 cm) were conditioned in a vacuum oven for at least 15 hours until the moisture levels were constant and their weights measured with a precision balance (accuracy 0.1 mg).

The wear test coupons were then mounted in a test chamber and a 10 weight % aqueous sand (AFS50-70 test sand) slurry at room temperature (20 to 25° C.) was impinged on the wear test coupon through a slurry jet nozzle positioned 100 mm from its surface with a diameter of 4 mm at a slurry jet rate of 15-16 meters/second with a slurry jet angle of 90° relative to the surface plane for 2 hours. Weight loss was measured after a period of drying and then weight loss was converted to a volume loss based on wear layer density. Data are reported in Table 1.

TABLE 1

| Material | SJE mg/2 hr | Measured shore A |
|---|---|---|
| EO1 | 0 | 64 |
| EO2 | 0 | 63 |
| EVA1 | 0.1 | 58 |
| EB1 | 0.3 | 72 |
| EO4 | 0.6 | 62 |
| EO5 | 0.9 | 67 |
| EO6 | 0.9 | 73 |
| EB2 | 1.7 | 84 |
| EVA2 | 2.4 | 52 |
| EO7 | 3.4 | 86 |
| EO7 + 4 weight % MB50-002 | 4.3 | 87 |
| EMA | 4.5 | 73 |
| EO7 + 2 weight % MB50-002 | 4.8 | 87 |
| 25 weight % ION-1/75 weight % EO6 | 5.7 | NM |
| EO7 + 8 weight % MB25 | 6.3 | 88 |
| EO8 | 6.4 | 85 |
| EO7 + 8 weight % MB002 | 8.0 | 89 |
| CLU | 9.6 | 82 |
| 25 weight % ION-1/75 weight % EO7 | 13.3 | 87 |
| 17 weight % ION-1/75 weight % EO7/ 8 weight % MB25 | 14.8 | 89 |
| ION-1 + 2 weight % MB25 | 15.5 | 90 |
| ION-1 | 16.9 | 85 |
| ION-1 + 4 weight % MB25 | 17.2 | 90 |
| 65 weight % E07/31 weight % ION-1/ 4 weight % MB25 | 17.2 | 91 |
| ION-1 + 8 weight % MB25 | 19.1 | 90 |
| 50 weight % ION-1/50 weight % EO5 | 20.4 | 84 |
| ION-1 + 4 weight % MB25 | 21.2 | 90 |
| ION-1 + 16 weight % MB25 | 23.4 | 90 |
| ION-1 + 4 weight % MB50-002 | 25.5 | 90 |
| ION-2 | 31.9 | 98 |
| 42 weight % ION-1/50 weight % EO7 + 8 weight % MB25 | 34.6 | 89 |
| HDPE | 38.2 | 98 |
| 34 weight % ION-1/50 weight % EO7 + 16 weight % MB25 | 43.6 | 90 |
| 49 weight % ION-1/35 weight % EO7 + 16 weight % MB25 | 50.2 | 91 |
| HDPE + 2 weight % MB50-002 | 51.1 | 97 |
| Mild Steel | 475.5 | |
| Mild Steel | 481.0 | |
| Mild Steel | 495.3 | |

Mild steel has a nominal density of 7.85 g/cm³ so the average mass loss of 484 mg/2 hr converts to a volume loss of 62 mm³/2 h. So in Table 1, all of the polymers (after correcting for density differences) have volume losses less than mild steel. For the hydroslurry transport, there is an expectation that soft polymer lined pipes would have wear rates substantially less than steel (less than 10 mm³/2 hr).

Soft homogenous polymers (Shore A less than 80) typically have less than 10 mg/2 hr of material wear on the SJE test. Alloys or melt blends that do not behave like homogenous polymers, may be soft but have high wear rates. Harder polymers typically have higher wear rates; for example ION-1 has an SJE of 16.9 mg/2 hr. However, preferred thermoplastics for the abrasion resistant layer have greater than 80 shore A hardness so that they can withstand the abuse and handling during assembly without being scratched or indented which would lead to flow disruptions. In addition the abrasion resistant polymers desirably have melting points above 70° C. so that they have acceptable dimensional stability at the potential extreme operating conditions of the tailings line, for example during clean-outs when a mixture of water and steam (no aggregate) may result in slurry temperatures approaching 70° C.

Adding surface modifying agents like siloxane masterbatches to the polymers (in a way that produces a molded part of consistent quality) typically only slightly increases the material loss on the SJE test.

ASTM G-75 Determination of Slurry Abrasivity (Miller Number) and Standard Test Method for Determination of Slurry Abrasion Response of Materials (SAR Number)

We used this apparatus to monitor the mass loss in a 12.5 by 25 mm by 4.6 to 7 mm thick wear specimen after reciprocating in a AFS 50-70 sand water slurry (50 weight % sand) for six hours (mass loss was measured every two hours over the six hour test period). The standard test protocol refers to a neoprene lap but our testing found the neoprene lab tended to degrade during the testing of these softer wear materials and accumulate on the wear specimen. The neoprene lap was replaced with a 316 stainless steel lap. The wear results are reported in Table 2.

TABLE 2

| | coupon 1 mm³/6 hrs | coupon 2 mm³/6 hrs | average mm³/6 hr |
|---|---|---|---|
| EMA | 6 | 8 | 7 |
| EO7 | 8 | 12 | 10 |
| EO7 | 10 | 12 | 11 |
| CLU | 22 | 16 | 19 |
| ION-1 | 20 | 21 | 21 |
| ION-1 | 26 | 25 | 25 |
| Mild Steel[1] (neoprene lap) | 52 | 51 | 51 |
| Mild Steel | 196 | 183 | 190 |
| Mild Steel | 185 | 186 | 186 |
| ION-2 | 256 | 278 | 267 |
| HDPE | 1152 | 957 | 1055 |

[1]There was a significant change in the material loss on the mild steel wear block when the lap material was changed from Neoprene (51 mm³/6 hr) to 316 stainless steel (186 to 190 mm³/6 hr).

On the G-75 wear test, low material loss is desirable. Because there is a certain amount of sample to sample variability, we considered the samples with wear rates less than 20 mm³/6 hrs to be samples with very good resistance to slurry wear. Samples with wear rates between 20 and 200 mm³/6 hr were considered to be moderately slurry wear resistant materials. Samples with wear rates greater than 200 were considered to be poor slurry resistant materials. Based on the G-75 testing, EMA, crosslinked urethane and m-LLDPE ethylene octene copolymers all looked like promising wear materials for the multilayer protective liner. While these materials have low G-75 wear, they also need to have a shore A hardness greater than 80 to minimize surface damage during assembly and a melting temperature greater than 70° C. to have dimensional stability at potential extreme operate temperatures.

D4060 Taber Abrasion

This was assessed using a CS-17 wheel with 1000-g load, and material loss in mg is reported after 1000 cycles. Harder materials typically have better Taber abrasion resistance. To avoid fouling of the wheels or test sample, the test was stopped and the apparatus and sample surface cleaned at intervals of 50 cycles. Table 3 reports the mass and calculated volume loss (based on nominal density) of mild steel and various polymers and blends of polymers.

TABLE 3

| Material | mg | mm³ |
|---|---|---|
| ION-1 + 16 weight % MB25 | 8 | 8 |
| Mild Steel | 79 | 10 |
| Mild Steel | 79 | 10 |
| HDPE | 10 | 10 |
| EO7 + 8 weight % MB25 | 13 | 15 |
| EO7 + 8 weight % MB002 | 13 | 15 |
| 17 weight % ION-1/75 weight % EO7/8 weight % MB25 | 15 | 16 |
| EO8 | 15 | 17 |
| EO7 + 2 weight % MB50-002 | 15 | 17 |
| ION-1 + 4 weight % MB50-002 | 19 | 21 |
| ION-1 + 8 weight % MB25 | 22 | 24 |
| ION-1 + 4 weight % MB25 | 22 | 24 |
| EO7 + 4 weight % MB50-002 | 23 | 25 |
| EVA 2 | 25 | 26 |
| EO7 | 25 | 28 |
| EO7 | 27 | 31 |
| ION-2 | 29 | 30 |
| ION-1 + 4 weight % MB25 | 29 | 31 |
| ION-1 + 2 weight % MB25 | 39 | 41 |
| EMA | 42 | 44 |
| ION-1 | 42 | 44 |
| 42 weight % ION-1/50 weight % EO7 + 8 weight % MB25 | 57 | 62 |
| 25 weight % ION-1 + 75 weight % EO7 | 162 | 176 |
| 25 weight % ION-1 + 75 weight % EO5 | 249 | 271 |

In Table 3, the mass loss of mild steel after 1000 cycles was 79 mg. Using a density of 7.85 g/cm³ for mild steel, the 79 mg of mass loss converts to a volume loss of 10 mm³. Using mild steel as a benchmark, combinations of ION-1 and a surface modifying agent or EO7 and a surface modifying agent also had volume losses similar to mild steel.

As mentioned in the discussion of the SJE results, the parts molded from the melt blends of two polymers need to behave homogeneously. For example a melt blend of Ionomer 1 (mass loss on Taber abrasion of 42 mg) and EO7 (mass loss on Taber abrasion of 25 mg) when converted into an injection molded part, had a mass loss on Taber Abrasion of 162 mg, which is substantially inferior to either of the individual ingredients. Increasing the density (hardness) of the EO polymers reduced the material loss on Taber abrasion. EO7 with density of 0.885 g/cm³ had 25 to 27 mg (28-31 mm³) of material loss on Taber Abrasion while EO 8 with density of 0.902 g/cm³ had 15 mg or 17 mm³ of material loss on Taber Abrasion. High density polyethylene, with a density of 0.962 g/cm³, lost 10 mm³ of material on Taber Abrasion. The EMA polymer with a shore A hardness of 77 had relatively high material loss on Taber abrasion of 44 mm³.

We have presented data that ranks the various polymers based on three types of abrasion (SJE, G-75 and Taber). In Table 1, a metallocene-catalyzed very low density polyethylene in the density range from 0.87 to 0.90 performed well on the SJE test having less than 10 mg of material loss. To ensure acceptable resistance to damage during installation of the lined pipe, it would be preferred to have a shore A hardness greater than 80 and to ensure adequate dimensional stability it would be preferred to have melting point greater than 70° C. The EO7 and EO8 samples in Table 1 meet these criteria. On the G-75 test the EO7 sample also performed well. For example, the EO7 sample with 0.885 g/cm³ density, 77° C.

mp, and 84 shore A hardness had just 3.4 mg/2 hr of wear on the SJE test and low G-75 wear of 10 mm³/6 hr. The Taber abrasion resistance for the EO7 was slightly better than the ionomer samples but by adding surface modifying agents to the metallocene-catalyzed very low density polyethylene, less material loss was observed on the Taber abrasion test.

To characterize the sensitivity of the various potential wear candidates to hydrolysis, tensile properties as per ASTM D638 were measured on "type 4" tensile bars after zero, two, four and six weeks, and 6 and 11 months of conditioning in water at 75° C. (50 mm/min XHS, 50 mm jaw separation).

TABLE 6

| | elongation at break | | | | | |
|---|---|---|---|---|---|---|
| grade | 0 week | 2 weeks | 4 weeks | 6 weeks | 6 months | 11 months |
| EMA | 843 | 959 | 1033 | 959 | 804 | 965 |
| EO7 | 515 | 514 | 536 | 560 | 498 | 518 |
| ION-1 | 227 | 454 | 463 | 350 | 400 | 92 |
| ION-2 | 69 | 75 | 91 | 84 | 35 | 15 |
| CLU | | | | | 268 | 103 |
| HDPE | 1260 | 1239 | 800 | 800 | 1194 | 813 |

The data in Table 6 suggest all of the materials have relatively good retention of tensile properties after 6 months of water exposure at 75° C. For the purpose of assessing performance in the water exposure test, the time to observe a loss of 50% of the initial elongation was considered the time to failure. After eleven months at immersed in water at 75° C., the EO7 sample (a metallocene-catalyzed very low density polyethylene with a density of 0.885 g/cm³) had essentially no change in the elongation to break.

The wear layer is just one component of the elastomer lined steel pipe. The lining must also adhere strongly to the steel wall and provide chemical resistance to prevent chemical attack at the steel/liner interface that would otherwise weaken the bond between liner and steel. As described in U.S. Ser. Nos. 13/413,186 and 13/413,208, ionomer adhesive layers and ionomer core layers provide the necessary strong bond to the steel and the necessary chemical resistance but it is desirable to identify coextruable adhesives that will produce strong bonds between the various layers in the pipe liner. Graft copolymers as described above provide excellent adhesion between layers of terpolymer or ionomer and polyolefin layers such as very low density polyethylene.

An example tubular liner has a three layer construction comprising an adhesive layer comprising ION-1, a core layer comprising ION-2 and an innermost surface layer comprising the very low density polyethylene wear layer. For a 0.4 inch (10 mm) thickness of the example liner 5 to 10% (0.5 to 1 mm) of the overall structure would be adhesive, 25 to 50% (2.5 to 5 mm) of the overall structure would be core and the balance of the overall structure would be wear layer. The three layer structure assumes the wear layer forms a strong bond to the core layer.

Another example tubular liner has a three layer construction comprising an adhesive layer comprising ION-1, a tie layer comprising a graft copolymer and an innermost surface layer comprising very low density polyethylene. For a 0.4 inch (10 mm) thickness of the example liner 5 to 10% (0.5 to 1 mm) of the overall structure would be adhesive, 5 to 10% (0.5 to 1 mm) of the overall structure would be tie layer and the balance of the overall structure would be wear layer. In this example, the very low density polyethylene provides abrasion resistance, water impermeability and structural strength to the liner, the ionomer provides good bonding to the pipe and the tie layer provides good bonding between the ionomer and the very low density polyethylene.

A second type of example tubular liner has a four layer construction comprising an adhesive layer comprising ION-1, a core layer comprising ION-2 and an innermost layer comprising the very low density polyethylene (e.g. EO7) wear layer, with the fourth layer being a coextrudable tie layer comprised of 50/50 pellet blend of ION-1 and EO7 or a graft copolymer. For a 0.4 inch (10 mm) thickness of the example liner, 5 to 10% (0.5 to 1 mm) of the overall structure would be adhesive. The tie layer would represent 5 to 10% of the overall thickness (0.5 to 1 mm). The core layer would be 25 to 50% (2.5 to 5 mm) of the overall structure and the balance of the overall structure would be the wear layer.

Methods for fabricating three- or four-layer liners are described in greater detail in copending applications U.S. Ser. Nos. 13/413,186 and 13/413,208. Those procedures can be adapted to prepare the liners described herein by substitution of the very low density polyethylene wear layer for the ionomer wear layer described therein.

The invention claimed is:

1. A thermoplastic multilayer structure comprising at least three layers comprising
    (a) a first surface layer comprising a soft thermoplastic composition with melting point in a range from about 70 to about 90° C. and Shore A hardness (ASTM D2240, ISO 868) from about 80 to about 90 comprising metallocene-catalyzed very low density polyethylene with a density of 0.86 to 0.91 g/cm³; optionally blended with a surface modifying agent;
    (b) a second surface layer comprising a thermoplastic ethylene acid terpolymer comprising an E/X/Y terpolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations, with melting point in a range from about 60 to about 100° C.; and (c), or (d) or a combination of (c) and (d); wherein
    (c) is an interior layer of a material comprising a thermoplastic composition with melting point in a range from about 75 to about 150° C., and moisture vapor permeation value less than 2 g·mil/100 in²·day; and
    (d) is at least one tie layer positioned in contact with one of the surface layers and in contact with one other layer, comprising a coextrudable composition comprising
        (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids; or
        (2) a blend of (i) a polyolefin selected from the group consisting of polyethylene homopolymer, polyethylene copolymer, or polypropylene copolymer and (ii) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

2. The multilayer structure of claim 1 wherein X is methacrylic acid, present in an amount from 5 to 20 weight % of the E/X/Y terpolymer and Y is butyl acrylate, present in an amount from 10 to 30 weight % of the E/X/Y terpolymer.

3. The multilayer structure of claim 2 wherein the second surface layer comprises the E/X/Y terpolymer.

4. The multilayer structure of claim 2 wherein the second surface layer comprises an ionomer of the E/X/Y terpolymer.

5. The multilayer structure of claim 1 wherein (c) is an interior layer comprising
(1) an ionomer of an E/W ethylene acid dipolymer wherein E represents copolymerized units of ethylene, W is present in an amount of about 2 to about 30 weight % of the E/W polymer and represents copolymerized units of a $C_{3-8}$ α,β-ethylenically unsaturated carboxylic acid, wherein at least a portion of the carboxylic acid groups in the dipolymer are neutralized to salts containing alkali metal cations, alkaline earth metal cations, transition metal cations, or combinations of two or more of these metal cations; or
(2) a polyethylene homopolymer, polyethylene copolymer, or polypropylene copolymer.

6. The multilayer structure of claim 5 wherein the second surface layer comprises an ethylene acid terpolymer comprising an E/X/Y terpolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

7. The multilayer structure of claim 6 wherein X is methacrylic acid, present in an amount from 5 to 20 weight % of the E/X/Y terpolymer and Y is butyl acrylate, present in an amount from 10 to 30 weight % of the E/X/Y terpolymer.

8. The multilayer structure of claim 7 wherein the second surface layer comprises the E/X/Y terpolymer.

9. The multilayer structure of claim 7 wherein the second surface layer comprises an ionomer of the E/X/Y terpolymer.

10. The multilayer structure of claim 5 wherein the interior layer comprises an ionomer of an E/W ethylene acid dipolymer wherein E represents copolymerized units of ethylene, W is present in an amount of about 2 to about 30 weight % of the E/W polymer and represents copolymerized units of a $C_{3-8}$ α,β-ethylenically unsaturated carboxylic acid, wherein at least a portion of the carboxylic acid groups in the dipolymer are neutralized to salts containing alkali metal cations, alkaline earth metal cations, transition metal cations, or combinations of two or more of these metal cations.

11. The multilayer structure of claim 10 wherein the multilayer structure comprises, in order, the first surface layer, a tie layer, an interior layer comprising an ionomer of an E/W dipolymer, and the second surface layer comprising an ethylene acid terpolymer comprising an E/X/Y terpolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

12. The multilayer structure of claim 5 wherein the interior layer comprises a polyethylene homopolymer, polyethylene copolymer, or polypropylene copolymer.

13. The multilayer structure of claim 12 comprising, in order, the first surface layer, the interior layer comprising high density polyethylene or polypropylene copolymer, a second tie layer and the second surface layer comprising an ethylene acid terpolymer comprising an E/X/Y terpolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations.

14. The multilayer structure of claim 13 wherein X is methacrylic acid, present in an amount from 5 to 20 weight % of the E/X/Y terpolymer and Y is butyl acrylate, present in an amount from 10 to 30 weight % of the E/X/Y terpolymer.

15. The multilayer structure of claim 14 wherein the second surface layer comprises the E/X/Y terpolymer.

16. The multilayer structure of claim 14 wherein the second surface layer comprises an ionomer of the E/X/Y terpolymer.

17. The multilayer structure of claim 1 that is in the form of a generally planar multilayer sheet, or multilayer tubular pipe liner.

18. The multilayer structure of claim 1 that is adhered to the inside of a metal pipe.

19. A method for protecting a metal pipe from abrasion during transport of a slurry comprising liquid and abrasive material through the pipe, the method comprising
(a) preparing a multilayer structure according to claim 1;
(b) inserting the multilayer structure inside a pipe;
(c) adhering the multilayer structure to the inside of the pipe to prepare a lined pipe;
(d) installing the lined pipe into a pipeline for transporting a slurry comprising liquid and abrasive material; and (e) transporting the slurry through the pipeline, wherein the wear rate of the lined pipe is less than the wear rate of a non-lined pipe.

20. The method of claim 19 wherein X is methacrylic acid, present in an amount from 5 to 20 weight % of the E/X/Y terpolymer and Y is butyl acrylate, present in an amount from 10 to 30 weight % of the E/X/Y terpolymer.

21. The method of claim 20 wherein the second surface layer comprises an ionomer of the E/X/Y terpolymer.

22. The method of claim 19 wherein the interior layer comprises
(1) an ionomer of an E/W ethylene acid dipolymer wherein E represents copolymerized units of ethylene, W is present in an amount of about 2 to about 30 weight % of the E/W polymer and represents copolymerized units of a $C_{3-8}$ $\alpha,\beta$-ethylenically unsaturated carboxylic acid, wherein at least a portion of the carboxylic acid groups in the dipolymer are neutralized to salts containing alkali metal cations, alkaline earth metal cations, transition metal cations, or combinations of two or more of these metal cations; or
(2) a polyethylene homopolymer, polyethylene copolymer, or polypropylene copolymer.

23. The method of claim 19 wherein the inside of the metal pipe is treated with an epoxy primer to provide an epoxy-primed metal pipe prior to inserting the multilayer structure into the pipe.

24. The method of claim 23 wherein adhering the multilayer structure to the inside of the pipe comprises heating the liner to metal interface by applying heat to the exterior of the metal pipe at a temperature less than 160° C. while applying pressure to the inside of the liner to expand the liner so that it comes into intimate contact with the interior inside surface of the epoxy-primed metal pipe and subsequently thermally activates the bond between liner and metal substrate.

* * * * *